Jan. 21, 1964  R. W. GARVIN  3,118,428
POWDER DISPENSER FOR ANIMALS
Filed Oct. 31, 1962  2 Sheets-Sheet 1

Robert W. Garvin
INVENTOR.

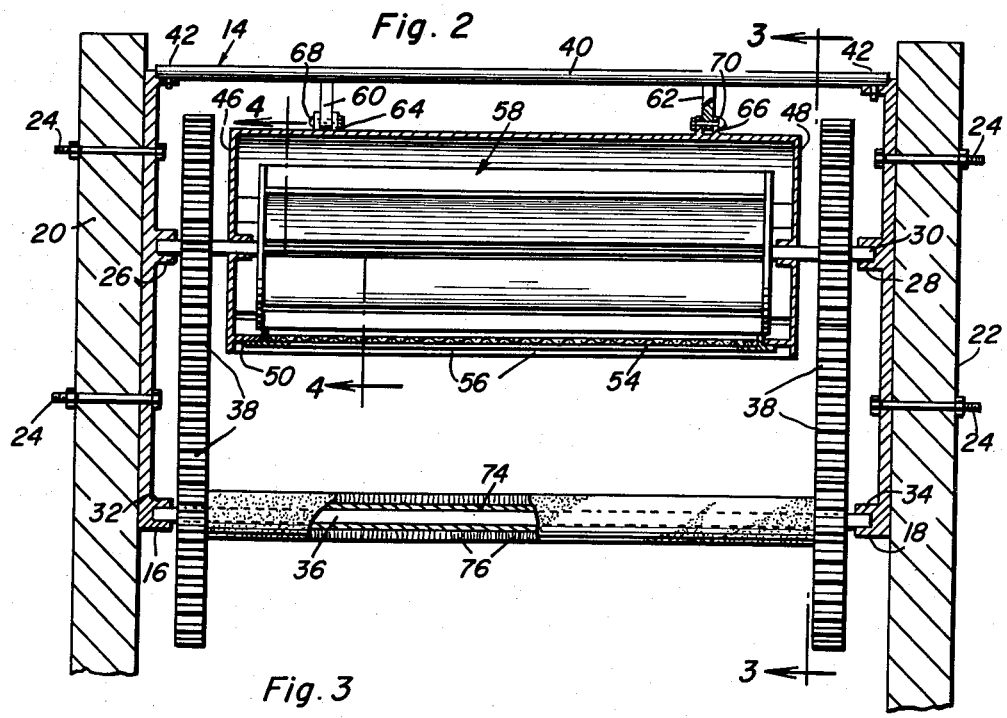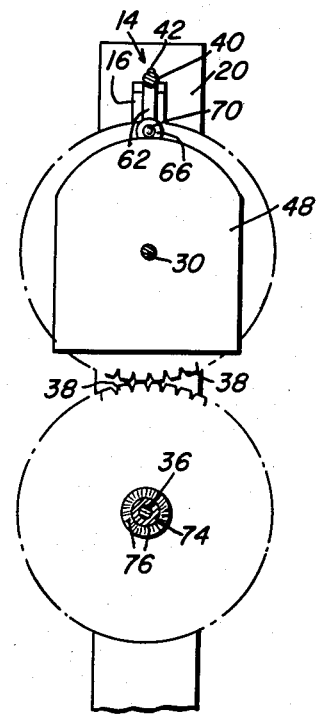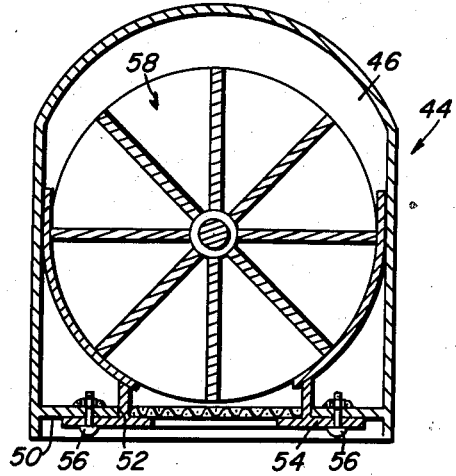

United States Patent Office 3,118,428
Patented Jan. 21, 1964

3,118,428
POWDER DISPENSER FOR ANIMALS
Robert W. Garvin, Rural Route, Elroy, Wis.
Filed Oct. 31, 1962, Ser. No. 234,351
12 Claims. (Cl. 119—159)

This invention relates to a novel and useful insecticide powder dispenser which is particularly well adapted to dispense insecticide powder on livestock.

The insecticide powder dispenser of the instant invention is constructed in a manner whereby the normal tendency of cattle or other livestock to rub up against or scrape underneath objects for scratching portions of their bodies will be sufficient to cause the dispenser to be actuated.

Although the powder dispenser of the instant invention includes a horizontally disposed actuating shaft under which livestock such as cattle may pass and rub with their backs in order to effect rotation of the actuating shaft and thus actuate the powder dispenser, it is to be noted that the actuating shafts alternatively could be journaled for rotation about upstanding axes.

Further, although a rotatable actuating shaft is provided other means may be utilized to actuate the powder dispenser although it is felt that a horizontally disposed actuating shaft can be used as an actuator for the dispenser of the instant invention while maintaining the cost of the manufacture of the powder dispenser at a minimum.

The main object of this invention is to provide a powder dispenser for livestock and the like which may be utilized to dispense insecticide powder on livestock from above the same when they are in an upright standing position.

Still another object of this invention is to provide an insecticide powder dispenser constructed in a manner whereby the normal tendency of livestock to rub up against an object may be utilized to actuate the powder dispenser thereby enabling the livestock to be more readily trained to use the insecticide powder dispenser.

Another object of this invention is to provide an insecticide powder dispenser in accordance with the preceding objects constructed in a manner whereby the insecticide powder in the reservoir thereof will be adequately protected from the elements and prevented from coming in contact with rain water and the like.

Still another object of this invention, in accordance with the preceding object, is to provide a reservoir for the insecticide powder dispenser that is rotatably supported and provided with only one insecticide inlet and outlet opening with the single opening being utilized both to dispense insecticide from the reservoir and also as a means for re-filling the reservoir.

Yet another object of this invention, in accordance with the immediately preceding object, is to provide an insecticide reservoir including means for releasably securing the reservoir in adjusted rotated positions whereby the single outlet opening therein may be disposed lowermost when used as an outlet for the insecticide powder and yet the reservoir may be rotated to a position with the single opening formed therein disposed uppermost in order that the single opening may be used as a means for replenishing the supply in the reservoir.

A final object of this invention to be specifically enumerated herein is to provide an insecticide powder dispenser for livestock and the like which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompaning drawings forming a part hereof, wherein like numerals refer to like parts throughout, and in which:

FIGURE 2 is a fragmentary enlarged vertical sectional view taken substantially upon the plane indicated by the section line 2—2 of FIGURE 1;

FIGURE 3 is a fragmentary vertical sectional view taken substantially upon the plane indicated by the section line 3—3 of FIGURE 2; and FIGURE 4 is an enlarged fragmentary vertical sectional view taken substantially upon the plane indicated by the section line 4—4 of FIGURE 2.

Figure 1:
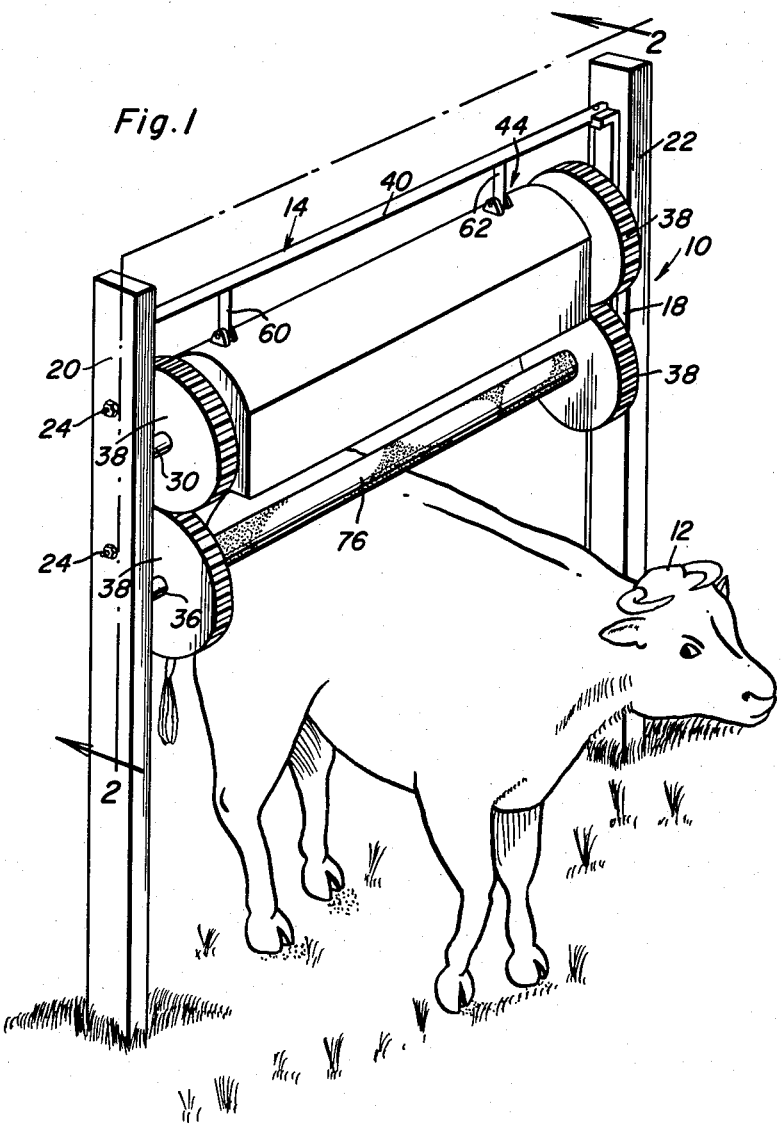
FIGURE 1 is a perspective view of the insecticide powder dispenser of the invention shown with an animal passing therebeneath in a manner so as to dispense insecticide powder from the reservoir of the dispenser.

Referring now more specifically to the drawings the numeral 10 generally designates the insecticide powder dispenser of the instant invention which is shown in FIGURE 1 of the drawings with an animal 12 passing therebeneath in a manner so as to dispense insecticide powder from the dispenser 10.

The dispenser 10 includes a support frame generally referred to by the reference numeral 14 comprising a pair of upright end members 16 and 18 which are secured to the upper ends of a pair of uprights 20 and 22 respectively. Any suitable type of fasteners 24 may be utilized to secure the end members 16, 18 to the uprights 20 and 22.

The end members 16 and 18 are provided with confronting journal sockets 26 and 28 which rotatably journal the opposite ends of a support shaft 30. In addition, the end members 16 and 18 also include a second pair of confronting journal sockets 32 and 34 respectively which rotatably journal the opposite ends of an actuating shaft 36. Each of the shafts 30 and 36 has a pair of gear wheels 38 fixed on its opposite ends and corresponding ones of the gear wheels 38 are meshed with each other in order that rotation of the actuating shaft 36 will effect rotation of the support shaft 30.

A cross member 40 is secured between the upper ends of the end members 16 and 18 by means of suitable fasteners 42 and an insecticide powder reservoir generally referred to by the reference numeral 44 includes a pair of end walls 46 and 48 by which the reservoir 44 is rotatably journaled on the support shaft 30 intermediate the corresponding gear wheels 38.

As can best be seen from FIGURES 2 and 4 of the drawings the reservoir 44 includes a bottom wall 50 having an opening 52 formed therein over which a closure screen assembly 54 is secured by means of suitable fasteners 56 and which comprises both an outlet opening for the insecticide powder within the reservoir and an inlet opening through which the reservoir 44 may be filled.

An agitator drum generally referred to by the reference numeral 58 is mounted on the support shaft 30 for rotation therewith within the reservoir 44 and thus may be utilized to agitate the insecticide powder within the reservoir 44 causing the insecticide powder to pass outwardly of the opening 52 and through the screen assembly 54 when the reservoir 44 is held in fixed position relative to the support 14.

The cross member 40 includes a pair of depending arms 60 and 62 which are suitably apertured at their lower ends and the upper portion of the reservoir 44 includes two bifurcated mounts 64 and 66 whose furcations are suitably apertured. The apertures formed in the furcations of the bifurcated mounts 64 and 66 are registrable with the corresponding apertures formed in the arms 60 and 62 respectively and suitable fasteners 68 and 70 are removably secured through these registered apertures in order to removably secure the reservoir 44 in fixed position relative to the support 14.

The gear or friction wheels 38 may be conveniently constructed of rubber or any other suitable substance and do not necessarily have to be in perfect mesh with each other. In fact, the gear wheels 38 could be plain disks with their peripheral edges knurled in a suitable manner to provide the necessary frictional engagement between corresponding ones of the gear wheels 38.

In addition, it may be seen from FIGURES 1 and 2 of the drawings that the actuating shaft 36 has a sleeve 74 mounted thereon intermediate the corresponding gear wheels 38 and that the sleeve 74 comprises the base for a roller brush including bristles 76. If it is desired, a different type of resilient covering for the actuating shaft 36 may be utilized in lieu of the sleeve 74 and bristles 76.

In operation, as the animal 12 passes beneath the actuating shaft 36, he rubs his back along the under portion of the actuating shaft 36 causing the latter to rotate and thus imparting rotation to the support shaft 30 and in turn the agitator 58. Rotation of the agitator 58 will of course cause insecticide powder to be dispensed outwardly through the opening 52 and the screen assembly 54. When it is desired to fill the reservoir, the fasteners 68 and 70 are first removed whereupon the reservoir 44 may then be rotated about the longitudinal axis of the support shaft 30 until the opening 52 is disposed uppermost. Then, the screen assembly 54 may be removed and insecticide powder may be poured into the reservoir 44 through the opening 52. Thereafter, the screen assembly 54 may again be secured over the opening 52 and the reservoir 44 may be rotated to the position illustrated in FIGURES 1 through 3 of the drawings and secured in position by means of the fasteners 68 and 70.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An insecticide powder dispenser for animals comprising a support frame adapted to be secured to a suitable support member for maintaining said frame in an elevated position relative to a supporting surface for animals to be disinfected, a generally horizontally disposed support shaft rotatably journaled from said support frame, an elongated powder reservoir extending longitudinally of and journaled on said support shaft and having a rotatable agitator disposed therein and mounted on said shaft for rotation therewith relative to said reservoir when the latter is held stationary relative to said frame, said reservoir having a combination outlet and inlet opening formed in one side wall thereof for dispensing powder agitated by said agitator and receiving powder when filling said reservoir and movable to upwardly and downwardly opening positions upon oscillation of said reservoir relative to said frame, and means carried by said frame and releasably engageable with said reservoir for releasably maintaining the latter in adjusted rotated position relative to said support frame.

2. The combination of claim 1 including an actuator movably mounted on said support frame and operatively connected to said shaft for rotation of the latter in response to movement of said actuator.

3. The combination of claim 2 wherein said agitator comprises an agitator shaft rotatably journaled from said support frame and drivingly connected to said support shaft.

4. The combination of claim 3 wherein said actuator shaft is mounted for rotation about a generally horizontal axis disposed beneath and generally paralleling the axis of rotation of said support shaft.

5. The combination of claim 4 wherein each of said shafts has a gear wheel mounted thereon and said gear wheels are meshed with each other.

6. The combination of claim 1 including a discharge screen assembly removably secured over said outlet and inlet opening.

7. The combination of claim 1 including an actuator movably mounted on said support frame and operatively connected to said shaft for rotation of the latter in response to movement of said actuator, said agitator comprises an agitator shaft rotatably journaled from said support frame and drivingly connected to said support shaft, said actuator shaft having a resilient covering disposed thereover.

8. The combination of claim 1 wherein said support frame comprises a pair of upright end members provided with confronting journal sockets rotatably supporting the opposite ends of said support shaft and secured to a pair of uprights comprising said suitable, support member and including lower ends adapted to be fixed relative to a supporting medium, and a cross member interconnecting the upper ends of said end members.

9. The combination of claim 8 wherein said means for releasably securing said reservoir in adjusted rotated positions comprises fasteners secured between said cross member and said reservoir.

10. The combination of claim 9 wherein said end members include a second pair of confronting journal sockets rotatably supporting the opposite ends of a second shaft comprising said actuator and disposed beneath said support shaft.

11. The combination of claim 10 wherein each of said shafts has a gear wheel mounted thereon and said gear wheels are meshed with each other.

12. The combination of claim 11 including a discharge screen assembly removably secured over said combination outlet and inlet opening.

References Cited in the file of this patent

UNITED STATES PATENTS

| | | |
|---|---|---|
| 1,389,435 | Burnett | Aug. 30, 1921 |
| 1,810,228 | Snyder | June 16, 1931 |
| 2,814,273 | Dickens | Nov. 26, 1957 |
| 2,988,053 | Minock | June 13, 1961 |